(12) United States Patent
Roduner et al.

(10) Patent No.: US 8,126,639 B2
(45) Date of Patent: Feb. 28, 2012

(54) METHOD FOR CONTROLLING THE AIR SYSTEM IN AN INTERNAL COMBUSTION ENGINE

(75) Inventors: Christian Roduner, Graz (AT); Markus Bachinger, Graz (AT); Michael Stolz, Graz (AT); Alois Danninger, Kapfenberg (AT); Klemens Neunteufl, Graz (AT)

(73) Assignee: AVL List GmbH, Graz (AT)

( * ) Notice: Subject to any disclaimer, the term of this patent is extended or adjusted under 35 U.S.C. 154(b) by 511 days.

(21) Appl. No.: 12/223,077

(22) PCT Filed: Feb. 1, 2007

(86) PCT No.: PCT/AT2007/000050
§ 371 (c)(1),
(2), (4) Date: Sep. 22, 2008

(87) PCT Pub. No.: WO2007/090216
PCT Pub. Date: Aug. 16, 2007

(65) Prior Publication Data
US 2010/0299046 A1    Nov. 25, 2010

(30) Foreign Application Priority Data

Feb. 9, 2006 (AT) ................................. A 201/2006
Sep. 28, 2006 (AT) ................................ A 1613/2006

(51) Int. Cl.
*F02D 9/00* (2006.01)
(52) U.S. Cl. .............. 701/108; 123/568.19; 123/568.21; 123/399
(58) Field of Classification Search ............. 123/568.11, 123/568.19, 568.21, 568.16, 399; 701/108
See application file for complete search history.

(56) References Cited

U.S. PATENT DOCUMENTS

| | | | |
|---|---|---|---|
| 6,948,475 B1 * | 9/2005 | Wong et al. .................... | 123/299 |
| 7,270,118 B2 * | 9/2007 | Yamaoka et al. ............. | 123/672 |
| 7,533,658 B2 * | 5/2009 | Chen ........................ | 123/568.19 |
| 7,631,492 B2 * | 12/2009 | Suresh et al. ................... | 60/295 |

* cited by examiner

*Primary Examiner* — Hai Huynh
(74) *Attorney, Agent, or Firm* — Dykema Gossett PLLC

(57) ABSTRACT

In a method for closed loop controlling the air system in an internal combustion engine, in particular a diesel internal combustion engine with a first actuating element for recirculated exhaust gas in the exhaust gas recirculation tract and a second actuating element for air in the inlet tract, the two actuating elements being adjusted as a function of each other. In order to increase the quality of closed loop control, provision is made for each actuating element to be controlled separately by its own respective controller, each controller being optimally configured for the respective controlled system, and a target value being provided for each controller.

10 Claims, 2 Drawing Sheets

METHOD FOR CONTROLLING THE AIR SYSTEM IN AN INTERNAL COMBUSTION ENGINE

BACKGROUND OF THE INVENTION

1. Field of the Invention

The invention relates to a method for closed loop control of the air system in an internal combustion engine, in particular a diesel internal combustion engine, with a first actuating element for recirculated exhaust gas in the exhaust gas recirculation tract and a second actuating element for air in the inlet tract, the two actuating elements being adjusted as a function of each other, and also to a device for carrying out the method. Furthermore, the invention relates to a method for controlling the characteristic values of combustion in an internal combustion engine with at least one control path.

2. The Prior Art

U.S. Pat. No. 6,105,559 B discloses an inlet and exhaust gas recirculation system for an internal combustion engine, the actuators, the exhaust gas recirculation valve and throttle flap being actuated as a function of each other by a single actuating element (actuator). The two actuators are joined together by a mechanical coupling. Only one actuating element and one controller are provided.

A diesel internal combustion engine with an inlet system and an exhaust gas recirculation system is known from U.S. Pat. No. 6,732,723 B1, an actuator being arranged in the inlet tract and an actuator in the exhaust gas recirculation tract. The two actuators are connected to the output of a single controller. A rigid logic divides the actuating signal at the controller output onto the two actuating elements.

The behaviour of the controller used in the prior art for both actuating elements represents a compromise, as a result of which the controller can be optimally configured for neither of the two controlled systems.

A further drawback is that the given structures impose marked restrictions in the selection of the actuating element boundaries. This gives rise to the problem that the controllery bandwidth is small and a different division of the actuators for other modes of operation is possible only to a limited extent.

It is known to control combustion in a stationary manner, i.e. at an operating point with a specific filling of the cylinders, via at least one injection parameter, in such a way that the characteristic values for the actual combustion and the desired combustion correspond. Deviations in the filling are compensated for by a controller in the air control path until the actual and the desired filling correspond. The target values for combustion in the stationary mode are datafied over the course of the calibration process. In this case, the target value for a reference variable is defined at an operating point. The target value is considered in conjunction with all other operating states at this operating point (in particular the filling). The stationary target value for the filling is stored in a memory at the same time as the target value for combustion. In this case, the actuators which determine the filling are set in such a way that the actual filling and the desired filling are equated. Based on the target value for the combustion position and the feedback about the actual combustion, the set parameters for combustion are changed in such a way that the actual combustion approximates the desired combustion. The adjustment variables are typically injection parameters, such as the moment of injection, injection pressure, quantity injected or the like. These can be adjusted (as a function of the injection system) at least within a combustion cycle. At the transition from one operating point to another, it is possible for the combustion control means to set the new value for the adjustment variables in a very short time. Nevertheless, the filling of the cylinders has based on the fuel control path a very different time constant, as a result of which the adjustment values for combustion in the fuel control path transiently do not match the current filling. This leads either to increased emissions with increased combustion noise or to low engine torque while at the same time consuming an increased quantity of fuel. In the past, these interactions could be reduced only at very great expense.

SUMMARY OF THE INVENTION

The object of the invention is to avoid these drawbacks and to increase of the controllery quality during closed loop control of the air system. A further object of the invention is to reduce emissions and also combustion noise and at the same time to improve the evolution of torque.

According to the invention, this is achieved in that each actuating element is controlled separately by a dedicated controller in each case, wherein each controller is optimally configured for the particular controlled system, and wherein a target value is provided for each controller. In this case, it is provided that at each moment only one of the two controllers is activated and the other controller deactivated, the actuating element, the controller of which is deactivated, being controlled by means of a defined value.

It is crucial that each actuating element has its own independent controller. Each controller can thus be optimally configured for its controlled system, as a result of which a higher bandwidth and better levelling behaviour can be achieved. A program logic switches over in this case between the two controllers, wherein at each moment only one of the two controllers is active and the actuating element, the controller of which is deactivated, is controlled by means of a defined value.

The actuating ranges of the two actuating elements are directly adjacent to each other. In other words, once the actuating range of the first actuating element (actuator for the exhaust gas recirculation valve) for controlling the mass air flow is finished, the second actuating element (actuator for the inlet throttle flap) immediately takes over the further actuating function. The end of the actuating range of an actuating element does not necessarily have to be formed by a physical boundary. Both switchover thresholds for the active controller and defined values for the actuating element of the deactivated controller can be variable.

Important for switching over between the two controllers is the correct controller initiation, so that the controlling system (viewed from both actuators) does not experience any unsteadiness (bumpless switching). Therefore, according to the invention, provision is made for the respective controllers to be informed of the defined values which are actually provided for the two actuating elements. These initiate the state of the controller in accordance with the actually defined value (anti-wind-up). This is particularly advantageous, since as a result of the initiation with the actual defined value, said actual defined value is used on reactivation of the previously deactivated controller as an initial condition for controlling this actuating element, thus allowing for the first time seamless switchover between the two controllers.

Advantages over the prior art are obtained as a result of the described structure with regard to the quality of the closed loop control by way of two controllers which are optimally configured for the respective controlled system, and also with regard to the flexibility provided by variable limits for the two actuating elements, and also variable defined values for the actuating element, the controller of which is deactivated.

Both the quality of closed loop control and flexibility in the division of the actuating range are important criteria for optimising the pollutant emissions in the transient engine mode.

The two actuators are configured so as to be redundant with regard to their influence on the mass air flow, but do not necessarily have to be identical. The aim is the open loop control/closed loop control of two actuating elements for the specific case that they actually are redundant if they were not bound in the actuating range or by external influences. For this reason, there is no advantage to be gained by controlling both actuating elements simultaneously. Only the closed loop control of an actuating element is active at every moment. The active controller passes on the closed loop control to the controller which has just been deactivated when it reaches the limit of its actuating range. This switchover produces a dependency between the two controllers.

As a result of the different physical marginal conditions, the transmission behaviour of each actuator is different with respect to the controlled variable (for example mass air flow). There are therefore two different controlled systems.

It is therefore advantageous if two different controllers are each optimally configured (for the time being independently of each other) for their controlled systems.

In order to reduce emissions and combustion noise, provision is made for a rapid control path, which can act and measure on each injection, to take into account the actuating behaviour of a slow control path, which requires in a time pattern a much longer time than the rapid control path, and for the repercussions on characteristic values of combustion and/or changes of at least one characteristic value of the rapid control path to be calculated directly from the extent of the deviation between the actual values and the target values of the slow control path. This allows the actual combustion to be converted into a desired combustion.

In this case, a rapid control path, which can act and measure on each injection, takes into account a slow control path, which requires in a time pattern a much longer time.

The rapid control path is capable of collecting actual values during each combustion, comparing them with the target values and changing the actuating values accordingly. The slow control path is capable of collecting in a time pattern its measured values, comparing them with the target values and changing the actuating values accordingly. The time pattern of the slow control path is much slower than the time increments with resolution for each combustion cycle.

The rapid control path can for example be an injection path in which injection parameters are calculated with resolution for each combustion cycle.

Preferably, the actual value of the slower control path is a characteristic value of the filling of the cylinders and can be formed on the basis of a sensor-supported physical model of the inert gas rate in the cylinder prior to combustion.

The repercussions on the combustion position and/or changes of at least one injection parameter can in this case be calculated directly from the extent of the deviation between the actual value and the target value of the filling of the cylinders. With the knowledge of the influence of the filling on the combustion position, a deviation between the actual filling and the desired filling can thus be applied directly for the closed loop control of combustion. The influence of a deviation between the actual filling and desired filling on the combustion position can thus be compensated for dynamically.

The target value for combustion can be established as in the past by determining the combustion position at which 50% of the fuel is burnt (MFB 50). Furthermore, the actual value of the combustion position can be influenced by adjusting the moment of injection. In addition, the inert gas rate (inert gas mass in relation to the total mass) in the cylinder can be determined prior to each combustion event using a physical model, based on sensor values provided. The degree of the inert gas rate takes into account both the charging pressure and the exhaust gas recirculation rate (EGR rate) and thus the influence of the charging system and EGR or throttle flap actuator. As, at the fixed injection parameters, the combustion position (MFB 50) changes in the top dead centre region linearly with the inert gas rate characteristic variable, the repercussions on the combustion position can be calculated directly from a deviation between the actual and desired inert gas rate.

The method according to the invention allows the dynamic behaviour of the closed loop control of combustion to be improved and thus the complexity of the datafication with regard to the optimisation of transient emissions, noise, driving behaviour and driving comfort or torque behaviour to be significantly reduced.

With the aid of sensors for air mass, temperatures and pressures, it is possible to determine using simple physical calculations that filling parameter which has a direct influence on combustion. By identifying a characteristic variable of this type, it is possible to evaluate the deviation of the current filling from the desired filling and thus to predict what repercussions this deviation will have on combustion.

BRIEF DESCRIPTION OF THE DRAWINGS

The invention will be described hereinafter in greater detail with reference to the figures, in which.

DETAILED DESCRIPTION OF THE PREFERRED EMBODIMENTS

Figure 1:
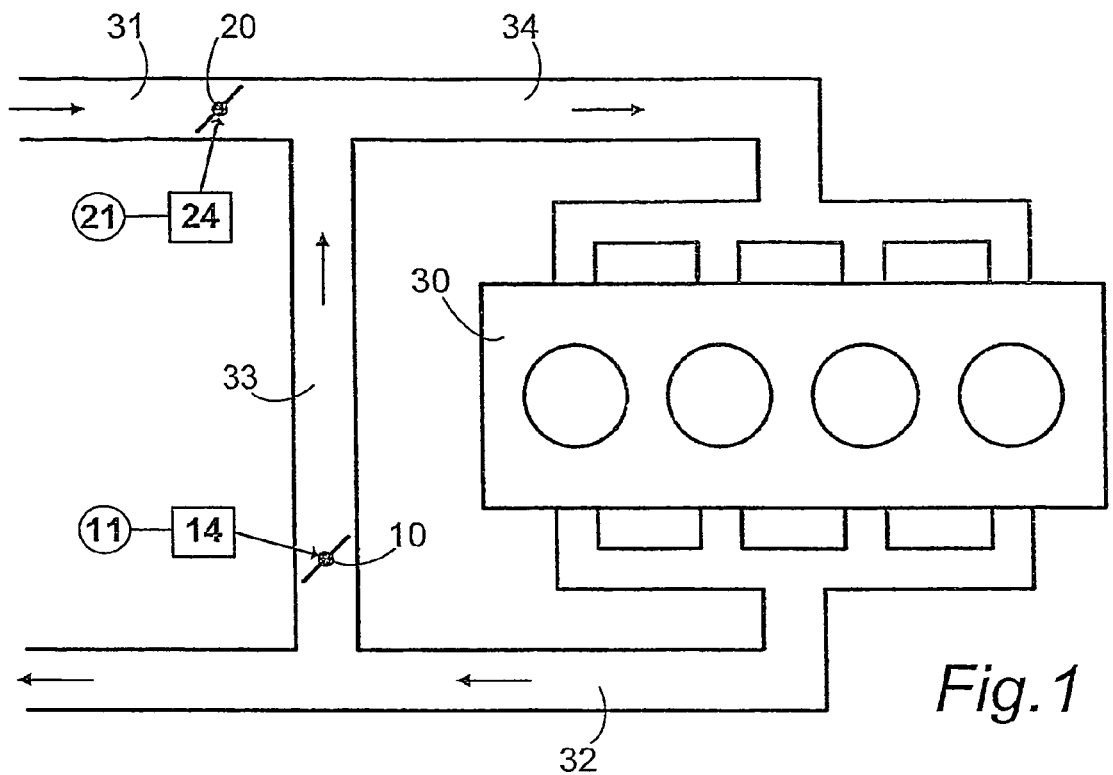
FIG. 1 is a schematic view of a device for carrying out the method.
Figure 2:
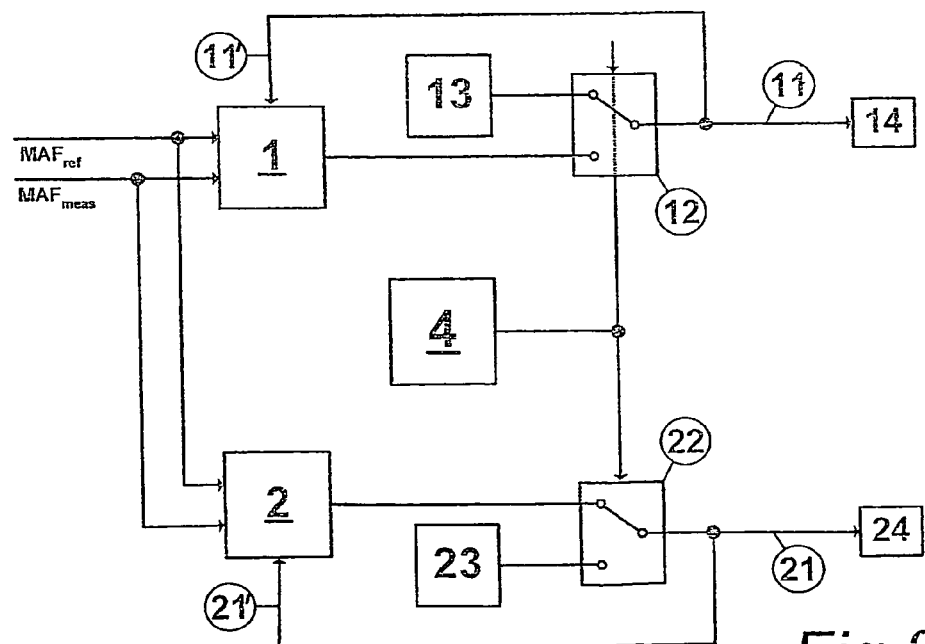
FIG. 2 is a block diagram illustrating the method according to the invention.
Figure 3:
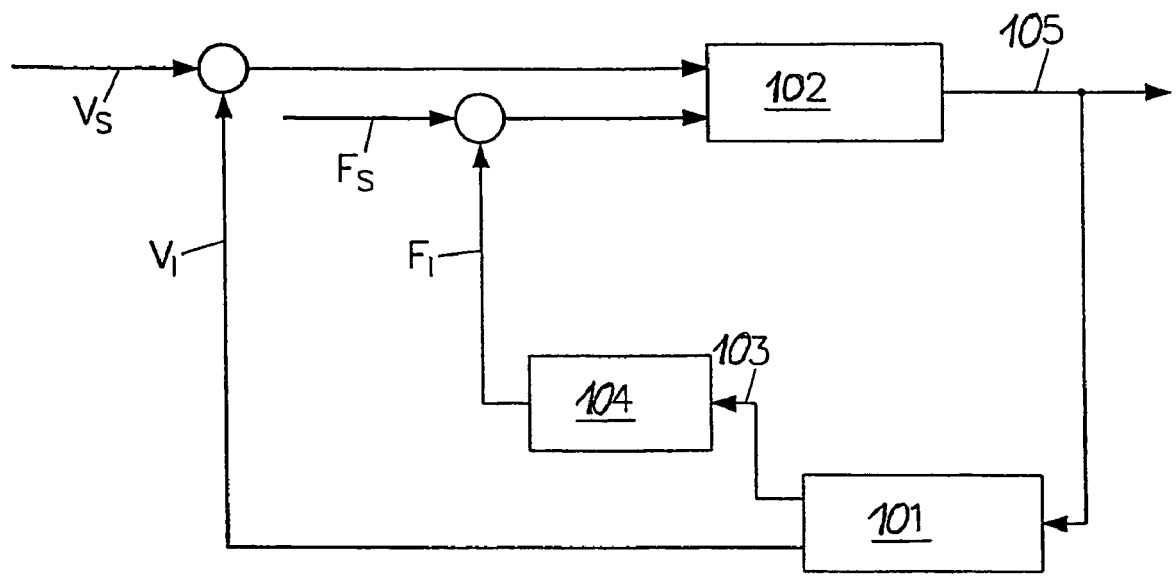
FIG. 3 is a further block diagram for describing the invention.

FIG. 1 is a schematic view of an internal combustion engine 30 with a fresh air tract 31, an inlet tract 34, outlet tract 32 and an exhaust gas recirculation tract 33, there being arranged in the exhaust gas recirculation tract 33 a first actuating element 14 actuating an exhaust gas recirculation valve 10 and in the fresh air tract 31 a second actuating element 24 actuating a throttle flap 20. Each actuating element 14, 24 has associated with it its own controller 1, 2. Also provided is a logic 4 which decides which of the two other controllers 1, 2 is activated or deactivated at each moment.

A target value for the mass air flow $MAF_{ref}$ is determined. The target value for the mass air flow $MAF_{ref}$ and the measured actual value of the air mass system $MAF_{meas}$ are used as input variables for calculating the control deviation in the controller 1 for the exhaust gas recirculation valve 10 and the controller 2 for the throttle flap 20.

A strategic function implied by the logic 4 decides which of the two controllers 1, 2 is activated and sets the target value for the actuating element, the controller output of which is deactivated, to a predefined value which is generated in the functions 13, 23 in which it actuates the switches 12, 22. The values for the actual defined values 11, 21 of the actuating elements 14, 24 serve as input variables 11', 21' for the corresponding controllers 1, 2. This information is necessary for the deactivated controller to track its internal state accordingly and thus to allow seamless switchover between both controllers.

The logic 4 operates as follows: Each actuating element 14, 24 is bound by hardware and in addition by software. For the time being, the first actuating element 14 (actuating element for the exhaust gas recirculation valve 10) is used to control the mass air flow MAF. Nevertheless, if the maximum opening of the first actuating element 14 is reached, the second actuating element 24 takes over the further control, the first actuating element 14 being controlled via a predefined value 13 (for example the maximum opening position) (as a result of which the controller 1 of the first actuating element 14 is deactivated). The actuating range of the two actuating elements 14, 24 is directly adjoining. The term "the maximum opening of an actuating element" refers to a variable limit which can flexibly be datafied and corresponds at most to the largest mechanical opening angle of the actuator.

The two controllers 1, 2 are each optimally configured for their stretch. This allows very high control quality to be achieved.

The logic 4 switches over between the two controllers 1, 2, wherein at all times only one of the two controllers 1, 2 is active and the actuating element of the other (deactivated) controller can be guided based on a defined value. The defined values for controlling the actuating element of the controller which has just been deactivated are generated in the functions 13, 23. The defined values are generally variable, although they can in specific cases correspond for example to the boundary of the respective actuating element. Reference numeral 13 denotes the function which generates the defined value for the first actuating element 1 and 23 denotes the function which generates the defined value for the second actuating element 2.

The stationary target value $V_S$ for combustion is datafied over the course of the calibration process. In this case, the target value $V_S$ for the reference variable is datafied at an operating point. This target value must be seen in conjunction with all other operating states at this operating point (in particular the filling). The stationary target value $F_S$ for the filling is at the same time datafied with the target value $V_S$ for combustion; in this case, the actuators which determine the filling are set in such a way that the best possible state is established. Based on the target value for combustion $V_S$ and the feedback about the actual combustion $V_I$ on the basis of the cylinder pressure sensors, the set parameters for combustion are changed in such a way that the actual combustion $V_I$ approximates the desired combustion V. The adjustment variables are typically fuel path variables: injection parameters 5 such as the moment of injection, injection pressure, quantity injected, or the like. These can be adjusted (as a function of the injection system) at least in a combustion cycle.

At the transition from one operating point to another, it is possible for the combustion control means 102 to set for the internal combustion engine 101 the new target value $V_S$, $F_S$ for the adjustment variables in a very short time. Nevertheless, the filling of the cylinders has very different time constants, and this leads to the adjustment values for combustion briefly not matching the current filling. This leads to increased emissions, increased combustion noise and drawbacks in driving comfort or torque behaviour. To date, it has been possible to reduce these influences only at very great expense. Thus, the previous system did allow combustion to be controlled in a stationary manner, i.e. at an operating point with a specific filling of the cylinders, in such a way that the actual combustion and the desired combustion correspond. Deviations in the filling are compensated for by a controller in the fuel path until the actual filling $F_I$ and the desired filling $F_S$ correspond. Nevertheless, rapid dynamic closed loop control of combustion was previously problematic.

These drawbacks can be reduced if the influence of the deviation in the filling is taken directly into account in the control of combustion. With the aid of sensors 103 (air mass, temperatures and pressures), it is possible to determine, using simple physical calculations 104, the parameters of the filling that have a direct influence on combustion. Furthermore, by identifying such a characteristic variable, it is possible to calculate the deviation of the current filling $F_I$ from the desired filling $F_S$ and thus to predict what repercussions this deviation will have on combustion. Suitable calculation of the filling is a prerequisite for this.

The information about the filling deviation and the knowledge how this deviation affects combustion allow the influence of the deviation in the filling to be taken directly into account in the closed loop control of combustion (influence equalisation).

The target value $V_S$ for combustion can be established as in the past by determining the combustion position at which 50% of the fuel is burnt (MFB 50). Furthermore, the actual value of the combustion position $V_I$ can be influenced by adjusting the moment of injection. In addition, the inert gas rate (inert gas mass in relation to the total mass) in the cylinder can be determined prior to each combustion event using a physical model 104, based on sensor values provided of standard sensors 103. The degree of the inert gas rate takes into account both the charging pressure and the EGR rate and thus the influence of the charging system and EGR or throttle flap actuator. As, at the fixed injection parameters, the combustion position (MFB 50) changes in the top dead centre region linearly with the inert gas rate characteristic variable, the repercussions on the combustion position can be calculated directly from a deviation between the actual and desired inert gas rate.

The method according to the invention allows the dynamic behaviour of the closed loop control of combustion to be improved and thus the complexity of the datafication with regard to the optimisation of transient emissions, noise, driving behaviour and driving comfort or torque behaviour to be significantly reduced.

The invention claimed is:

1. A method of controlling an air system for an internal combustion engine which includes a combustion gas inlet tract connected to the internal combustion engine for supplying combustion gases thereto, an outlet tract connected to the internal combustion engine for removing exhaust gases therefrom, a recirculation tract connected between the outlet tract and the combustion gas inlet tract for recirculating exhaust gases to the combustion gas inlet tract, a first valve in the recirculation tract controlled by a first actuating element connected to a first controller via a first switch, a fresh air tract connected to the combustion gas inlet tract for supplying fresh air thereto, and a second valve in the fresh air tract controlled by a second actuating element connected to a second controller via a second switch, the method comprising the step of operating the first and second switches so that only one of the first and second actuating elements is controlled by a respective controller, a second of the first and second actuating elements being controlled by a respective defined value.

2. The method according to claim 1, wherein the defined values which are actually provided for the two actuating elements are returned to the respectively corresponding controller to initiate its state.

3. The method according to claim 1, wherein the defined values of the respectively deactivated controller are variable.

4. The method according to claim 1, wherein a switchover logic performs the activation and deactivation of the corresponding controllers.

5. The method according to claim 1, wherein the controllers are switched over between activation and deactivation in each case at the boundary for the respective actuating element.

6. The method according to claim 5, wherein the boundary is alterable.

7. The method according to claim 5, wherein the boundary is different with respect to an end position of the actuator.

8. An air system for an internal combustion engine which includes a combustion gas inlet tract connected to the internal combustion engine for supplying combustion gases thereto, an outlet tract connected to the internal combustion engine for removing exhaust gases therefrom, a recirculation tract connected between the outlet tract and the combustion gas inlet tract for recirculating exhaust gases to the combustion gas inlet tract, a first valve in the recirculation tract, a fresh air tract connected to the combustion gas inlet tract for supplying fresh air thereto to mix with the recirculating exhaust gases, a second valve in the fresh air tract, and a closed loop control system which comprises a first actuating element connected to the first valve, a first controller connected to the first actuating element via a first switch, a second actuating element connected to the second valve, a second controller connected to the second actuating element via a second switch, and a third controller connected to the first and second switches to assure that only one of said first and second actuating elements is controlled by a respective controller at any given time.

9. The device according to claim 8, wherein the first actuating element activates an exhaust gas recirculation valve and the second actuating element a throttle flap (26).

10. The device according to claim 8, wherein the two actuating elements are redundant, but not identical with regard to their influence on mass air flow.

* * * * *